Figure 1:
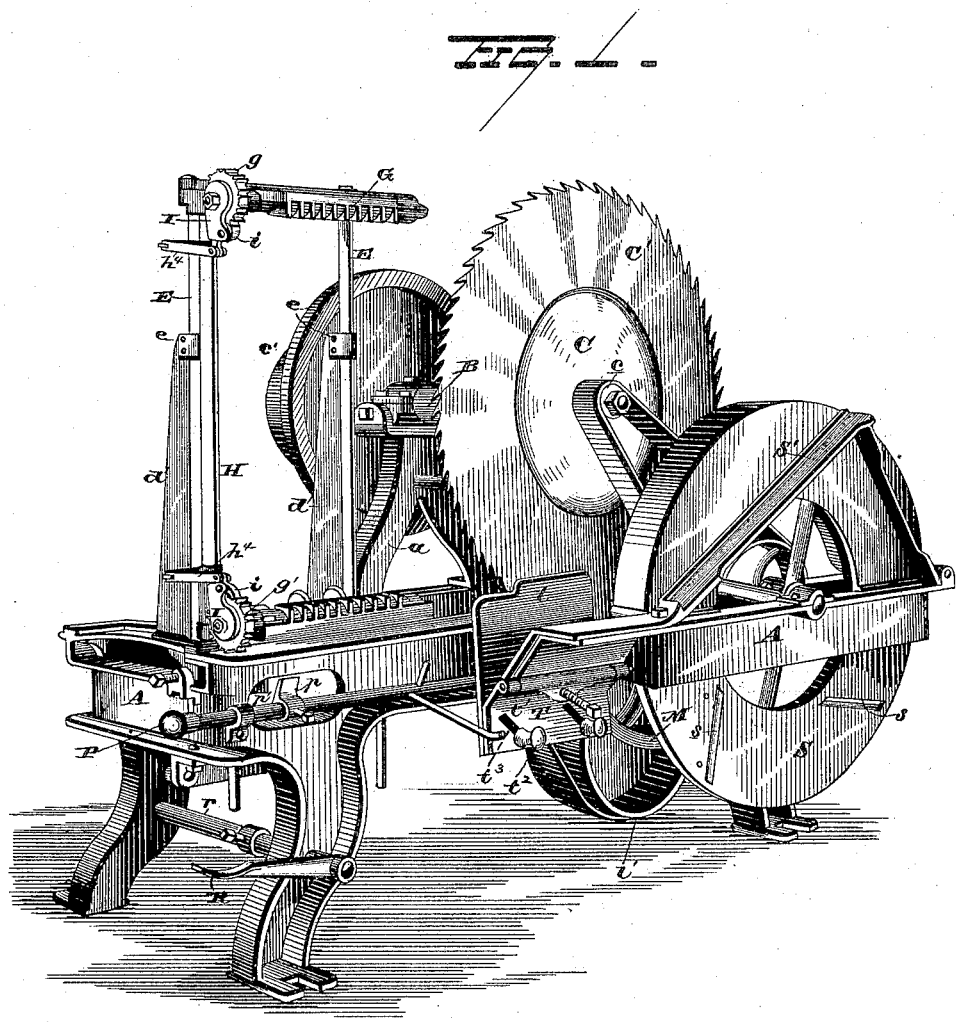

(No Model.)  3 Sheets—Sheet 1.

D. F. HUNT.
SHINGLE SAWING MACHINE.

No. 301,123. Patented July 1, 1884.

WITNESSES
Nottingham
E. C. Seward

INVENTOR
David F. Hunt.
By H. A. Symmons
Attorney

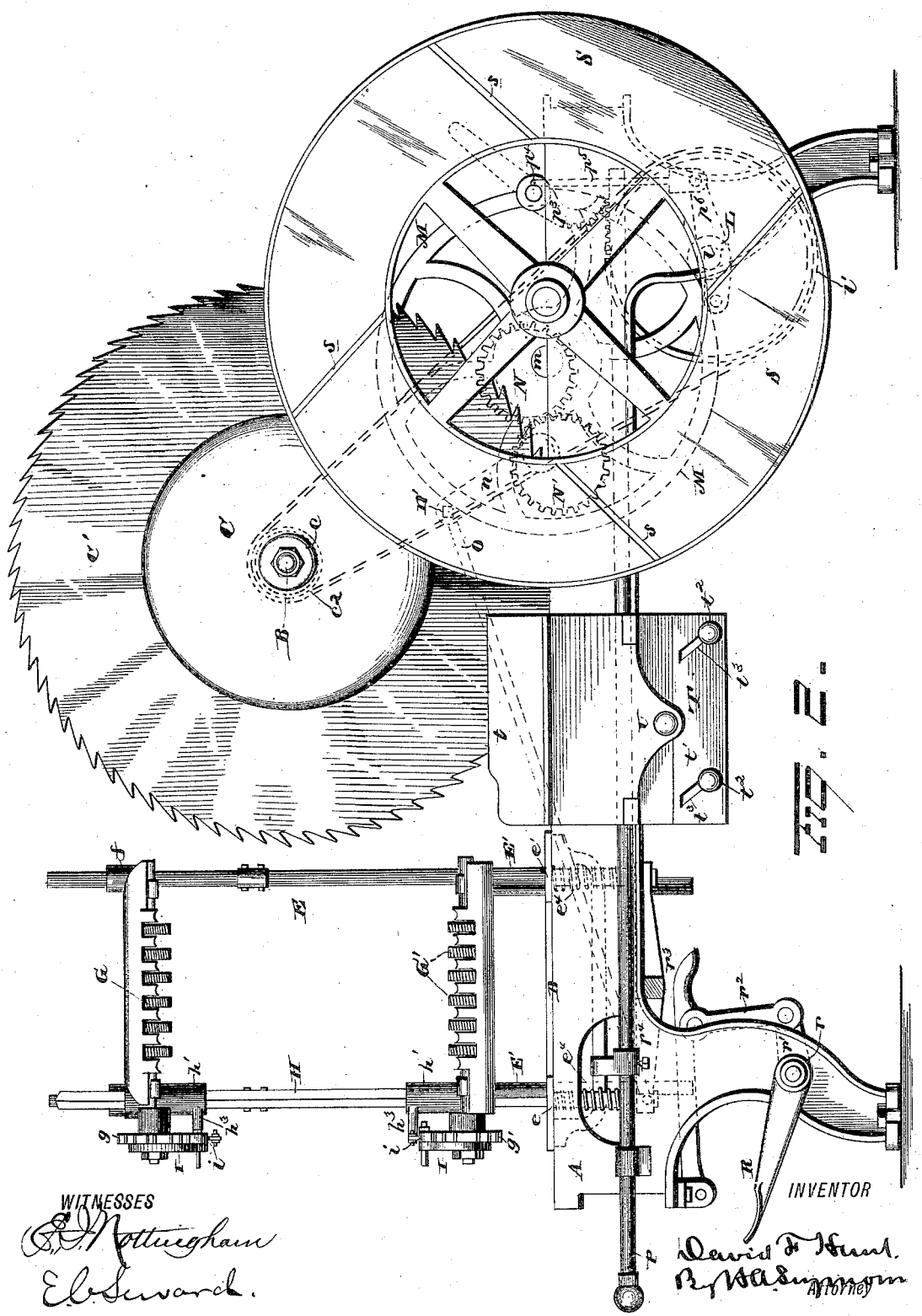

(No Model.) 3 Sheets—Sheet 3.
D. F. HUNT.
SHINGLE SAWING MACHINE.
No. 301,123. Patented July 1, 1884.
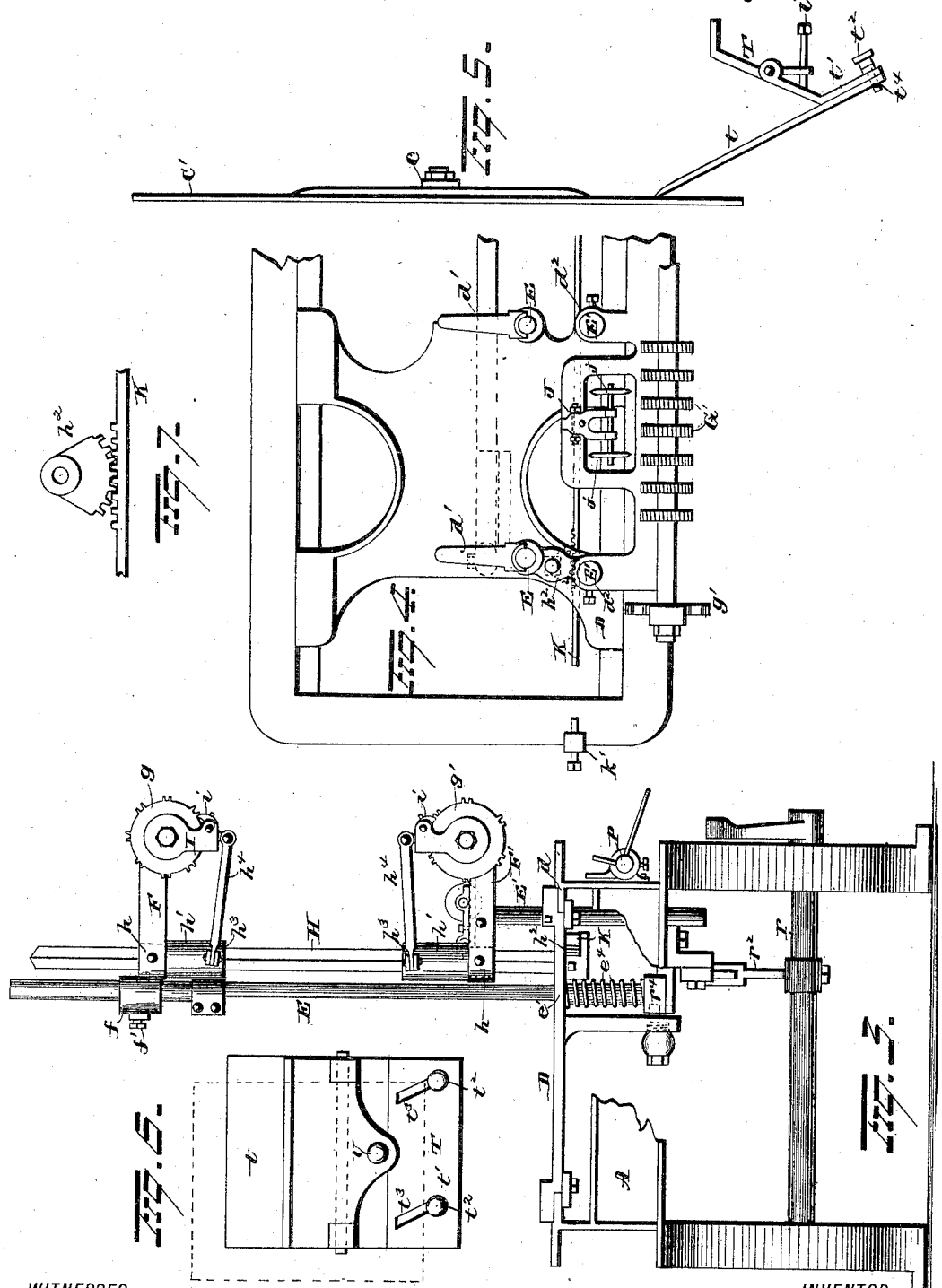
WITNESSES
INVENTOR
David F. Hunt.
By H. A. Seymour,
Attorney

UNITED STATES PATENT OFFICE.

DAVID F. HUNT, OF ANTRIM, NEW HAMPSHIRE.

SHINGLE-SAWING MACHINE.

SPECIFICATION forming part of Letters Patent No. 301,123, dated July 1, 1884.

Application filed January 12, 1884. (No model.)

*To all whom it may concern:*

Be it known that I, DAVID F. HUNT, of Antrim, in the county of Hillsborough and State of New Hampshire, have invented certain new and useful Improvements in Shingle-Machines; and I do hereby declare the following to be a full, clear, and exact description of the invention, such as will enable others skilled in the art to which it appertains to make and use the same.

My invention relates to an improvement in shingle and heading machines, the object being to provide a mechanism which shall automatically feed the bolts to the saw with perfect accuracy, a further object being to provide devices whereby the carriage shall be automatically returned at an accelerated speed, a further object being to provide an improved box for receiving the shingles or boards from the saw and holding them in a position from whence they may be conveniently taken to the jointer, and a further object being to provide a machine which can be conveniently operated, will execute work rapidly, is durable, and of moderate cost.

With these ends in view my invention consists in certain features of construction and combinations of parts, as will be fully described, and pointed out in the claims.

In the accompanying drawings, Figure 1 is a front view of the machine in perspective; Fig. 2, a side elevation with parts removed; Fig. 3, an end elevation; Fig. 4, a partial plan view, and Figs. 5, 6, and 7 detached views.

A represents a supporting-frame of suitable size and material. This frame is provided with the upwardly-extending standards $a$, in which the saw-shaft or arbor B is journaled. At the front end of this shaft B the saw-hub C is rigidly mounted. The hub C is provided with a flange, to which the saw $C'$ is secured, and the said hub terminates forwardly in the band-pulley $c$. At the rear end of the shaft B the driving-pulley $c'$ is rigidly mounted, by which motion is communicated to the entire machine. A cone-shaped driving-pulley, $c^2$, is also rigidly mounted on the shaft B, for purposes which will be hereinafter explained.

The carriage consists of the base D, which is adapted to be reciprocated on the ways $d$, and the upright standards $d'$, rigidly secured to the base D, and at a sufficient distance apart to admit the largest bolt which it is desirable to saw between them. To these upright standards $d'$ vertical rods E are secured by means of the sleeves $e$, in which the rods have an easy sliding motion. The rods E are further held in position by passing through perforations $e'$ in the base D of the carriage, in which perforations the rods are allowed a sliding motion. The rods E are connected together at their bases by the cross-bar $r^4$, which limits their upward motion through the perforations $e'$. These rods E are further provided with the spiral springs $e^4$ between the cross-bar $r^4$ and the carriage-base D, which increase the depressive force of the rods. The upper portions of the rods E support the forwardly-extending horizontal arms F, which are adjustably secured to the rods by the bosses $f$, which embrace the rods and the set-screws $f'$. The forward ends of the arms F are provided with suitable bearings, in which the axle of the upper roller, G, and spur-wheel $g$ is journaled. The axle of the lower roller, $G'$, and spur-wheel $g'$ is journaled in the ends of the arms $F'$. The arms $F'$, which are parallel to the arms F and form the ends of a rectangular-shaped frame-work, are supported by the vertical rods $E'$, which are rigidly secured to the arms $F'$ near the centers of these arms, and pass down through the carriage-base D and bosses $d^2$, in which said rods are allowed a sliding motion, and are held in vertical adjustment by set-screws. A rod, H, either square or other desired angular shape in cross-section, or round, having groove for spline or feather, is secured in a vertical position between the end supporting-rods, E and $E'$, by passing through sleeves or collars $h$, secured to the arms F $F'$, and through the base D of the carriage, and in which the rod H is allowed a sliding and rotary motion. The rod H is provided with the sleeves $h'$, loosely secured to the under side of the arm F and upper side of the arm $F'$, respectively, which are allowed to slide on the rod H, but which are so closely fitted as to turn with the rod. This rod H is further provided with the toothed sector $h^2$, rigidly secured to the lower end of said rod. The sleeves $h'$ are each provided with an arm, $h^3$, cast integral therewith or rigidly secured thereto, in the outer ends of which the connecting-rods $h^4$ are pivoted. Plates I, having projections which extend a little beyond the circumferences of the spur-wheels $g$ and $g'$, are loosely mounted on the roller axles or hubs of the spur-wheels just outside of the spur-wheels. The pawls $i$ are pivoted to the inside of the projections of these plates in positions to engage the teeth of the spur-wheels $g$ and $g'$. The connecting-rods $h^4$ are pivoted to the pawls $i$, as clearly shown in the drawings.

The rollers G and G' consist of a number of circular sections mounted rigidly upon the roller-axles a short distance apart, and provided with diagonal corrugations upon their curved surfaces. A bifurcated plate, J, provided with an axle carrying two small knife-wheels, $j$, is secured in the frame which supports the lower roller, G', a short distance in the rear of the roller, and is supported upon springs, by means of which the wheels are caused to adjust themselves to any irregularities in the end of the bolt which they are helping to support. A rack, K, is held in a horizontal position under the base D of the carriage by depending sleeves, in which it is allowed a sliding motion. This rack engages the sector $h^2$, and is somewhat longer than the carriage, so that it will come in contact with the right-hand or saw end of the frame A just before the carriage completes its motion in that direction, and will strike a set-screw, $k'$, in the opposite end of the frame A just before the carriage completes its return motion.

The carriage is reciprocated by means of friction and eccentric wheels as follows: The V-shaped periphery of the small friction-wheel L, mounted on a shaft, $l$, journaled in the main frame, said shaft $l$ carrying a cone-shaped pulley, $l'$, which is connected with the cone-pulley $c^2$ by a belt, is brought in contact with the V-shaped periphery of the large friction-wheel M. The large friction-wheel M is mounted on a stud, $m$, rigidly secured to the main frame, and carries the eccentric spur-wheel N, rigidly secured to its hub. The eccentric spur-wheel N gears in the eccentric spur-wheel N', which latter is also mounted on a stud rigidly secured to the main frame, and which carries on its hub the arm $n$, provided with the wrist-pin $n'$, by which one end of the connecting-rod O is secured, the other end of the rod O being pivoted to the carriage. These eccentric spur-wheels N and N' are so situated with respect to one another that the carriage will be returned with accelerated speed. The operating-rod P is secured in a horizontal position along the front of the main frame by means of brackets, in which it is allowed a sliding and rotary motion. It consists of two sections screwed together so that the section at the carriage end of the frame can be partially rotated without causing the section at the saw end of the frame to be turned. This operating-rod is provided with a dog, $p$, adapted to pass through an opening in the frame A, and engage a hook, $p'$, on the carriage, and with a short rack, $p^2$, near the right-hand end, which engages a toothed lever, $p^3$. This toothed lever $p^3$ is pivoted to the main frame and provided with a wrist-pin, $p^4$, to which one end of the connecting-rod $p^5$ is secured, while the other end of $p^5$ is pivoted to the end of the lever $p^6$, which engages or supports one end of the shaft on which the small friction-wheel L is mounted. It will now be seen that the operating-rod, when slid to the right, will engage the toothed end of the lever $p^3$ and carry it to the right, which will elevate the lever $p^6$ and bring the small friction-wheel L in contact with the large friction-wheel M, and thus set the carriage-reciprocating gear in motion. By turning the left-hand section of the operating-rod over, so as to throw the dog $p$ through the frame A, the hook $p'$ on the carriage will engage the dog $p$ as the carriage returns, thus sliding the operating-rod to the left, throwing the friction-wheels out of contact, and thus stopping the reciprocating motion of the carriage. The treadle R is rigidly secured to the front end of the rod $r$, journaled in the lower portion of the main frame, and occupies a position convenient for the left foot of the operator when standing in front of the machine. The rod $r$ has an arm, $r'$, rigidly secured to it. The connecting-rod $r^2$, pivoted to the end of the arm $r'$ and to the lever $r^3$, transmits the motion of the treadle to the lever $r^3$, which engages the cross-bar $r^4$, the latter being secured to the lower ends of the supporting-rods E. The main frame A extends forward at the right hand sufficiently to furnish bearings for the shaft of the jointer-wheel S and a support for the shingle-box. The wheel S, actuated by a belt running from the pulley $c$ on the saw-shaft around a pulley on its own, is provided with oblique knives $s$, which trim the edges of the shingles as they lie on the guide S'. A hinged semicircular cover protects the upper portion of the wheel S. The shingle-box consists of two rectangular-shaped boards or sheets of metal placed together to form a V-shaped trough, the front leaf of which, T, is hinged to the frame A at the left of the jointer-wheel, while the rear leaf, $t$, is secured to a flange, $t'$, on the lower edge of T by means of two clamp-nuts, $t^2$. The flange $t'$ is provided with slots $t^3$, which admit the threaded bolts $t^4$, said bolts being rigidly secured in the leaf $t$, and by means of these slots the leaf $t$ can be raised and lowered to suit the elevation of the lower roller of the carriage. A set-screw, U, passing through the frame which supports the shingle-box and bearing against the leaf T, holds the upper edge of the leaf $t$ in the required proximity to the saw. The object of the hinge on the shingle-box is to admit of its being turned away from the saw in case pieces of wood become jammed between the saw and leaf $t$. The raising and lowering of the leaf t is a great advantage, on account of the regularity it preserves in the fall of the shingles. The operation of the machine is as follows: The rollers G and G' are adjusted in positions such that the center of the shingle-bolt will lie on a horizontal line with the center of the saw, and a distance apart which is a little less than the length of the bolt. The foot is pressed on the treadle R, which elevates the upper roller to receive the bolt. The foot being removed, the bolt is held securely between the rollers by the weight of the upper roller and supporting-rods, and the depressing force of the spiral springs $e^4$. The carriage is now set in motion by sliding the operating-rod P to the right. Just before the carriage completes its motion to the right, the right-hand end of the rack K comes in contact with the main frame and slides to the left, thereby turning the rod H, with the armed sleeves $h'$, to the left and disengaging the pawls $i$ from the spur-wheels $g$ and $g'$. Upon the return of the carriage the left-hand end of the rack K comes in contact with the set-screw $k$, thus sliding the rack to the right, and turning the rod H, with the sleeves $h'$, to the right, and causing the pawls $i$ to engage the spur-wheels $g$ and $g'$, thereby rolling the shingle-bolt forward for the next cut. It will be plainly seen that the sooner or later the rack K comes in contact with the set-screw $k'$ the greater or lesser will be the amount which the bolt will be advanced; hence the set-screw $k$ becomes the means of determining with the greatest accuracy the number of teeth the spur-wheels will advance, and thereby the thickness of the shingle. The diagonal corrugations on the curved surfaces of the rollers serve to give the bolt a uniform motion as it advances, and also to hold it securely in the required adjustment.

From the above description it will be seen that one person can adjust the bolt, joint the shingles, and operate the machine without scarcely moving out of his tracks, while the saving in time by the rapid return of the carriage and the new principle upon which the set mechanism is constructed are advantages of the highest importance.

I do not wish to hold myself strictly to the construction herein set forth, as it is evident that slight changes may be made without departing from the spirit and scope of my invention.

Having fully described my invention, what I claim as new, and desire to secure by Letters Patent, is—

1. In a shingle-machine, the combination, with a saw and a reciprocating carriage, of two independently-adjustable set-rollers connected to and moving with the carriage, and constructed to hold the bolt in contact with the saw.

2. In a shingle-machine, the combination, with a saw and a reciprocating carriage, of two independently-adjustable set-rollers connected to and moving with the carriage, and devices for automatically turning the rollers.

3. In a shingle-machine, the combination, with a saw and a reciprocating carriage, of two upright rods yieldingly connected to the carriage and supporting the upper set-roller, two upright rods adjustably connected to the carriage and supporting the lower set-roller, and devices for automatically rotating both rollers, substantially as set forth.

4. In a shingle-machine, the combination, with a saw and a reciprocating carriage, of set-rolls connected to and moving with the carriage, an upright angular rod journaled to the carriage and operating the set-rolls, and provided with a segment-gear at its lower end, and a sliding rack-bar loosely secured to the under side of the carriage and engaging the segment on the angular rod, substantially as set forth.

5. In a shingle-machine, the combination, with a saw and a reciprocating carriage, of set-rolls connected to and moving with the carriage, an upright angular rod loosely secured near its lower end to the carriage, sleeves $h'$, encircling said rod and provided with devices for turning the set-rolls, a segment-gear secured to the lower end of the angular rod, a sliding rack-bar secured to the under side of the carriage, and an adjustable stop secured to the machine-frame for limiting the thrust of the rack-bar.

6. In a shingle-machine, the combination, with a saw and a reciprocating carriage provided with adjustable set-rolls, of the angular rod, devices, substantially as described, for connecting the set-rolls to the angular rod, whereby the former are revolved, the segment-gear secured to the angular rod, sliding rack-bar secured to the carriage, and set-screw secured to the frame for regulating the thrust of the rack-bar.

7. In a shingle-machine, the combination, with a saw and a reciprocating carriage, of a pitman, one end of which is pivoted to the carriage, a wheel having an eccentric gear-wheel, N, secured eccentrically to its shaft, and a second gear, N', eccentrically journaled to the machine-frame, and provided with an arm, $n$, to the free end of which the opposite end of the pitman is secured, the said parts being combined for the purpose of accelerating the speed of the carriage in one direction, substantially as set forth.

8. In a shingle-machine, the combination, with the saw and the reciprocating carriage, of two vertically-movable rods secured to the carriage, and supporting the upper rolls, and two vertical rods adjustably secured to the carriage and supporting the lower roll, substantially as set forth.

9. In a shingle-machine, the combination, substantially as before set forth, of the reciprocating carriage, upright rods mounted in bearings at the upper ends of said rods, a cross-head connecting the lower ends of said rods, springs interposed between said cross-head and a rigid abutment, and a treadle secured to the frame and adapted to raise the cross-head and rods against the stress of the springs.

10. In a shingle-machine, the combination, with a saw, of a reciprocating carriage, vertically-movable supporting-rods E, secured to said carriage, rods E', also secured to said carriage and adjustable independently of the rods E, and rollers secured to said rods and adapted to support the bolt, substantially as set forth.

11. In a shingle-machine, the combination, with a reciprocating carriage and a roller and roller-frame supported on the rods E', the said rods being vertically adjustable on the carriage, of spring-pressed knife-edge wheels journaled at the rear of the lower roller in bearings supported by the frame of said roller, substantially as set forth.

12. In a shingle-machine, the combination, with suitable driving-gear, a saw, and a carriage adapted to be moved toward and from the saw, of means connected with the driving-gear for moving said carriage, and a longitudinally-movable operating-rod made in two sections, one of which can be rotated for connecting or disconnecting the carriage from its actuating mechanism, substantially as described.

13. In a shingle-machine, a shingle-box adjustably secured to the frame of the machine in close proximity to the saw, for the purpose of receiving the shingles as they are sawed from the log.

14. In a shingle-machine, a shingle-box secured to the machine-frame, and consisting, essentially, of two leaves or plates, constructed substantially as shown, one of the said plates being vertically adjustable, and devices for adjusting the box horizontally.

In testimony whereof I have signed this specification in the presence of two subscribing witnesses.

DAVID F. HUNT.

Witnesses:
RUFUS D. CHASE,
ANSON M. LYMAN.